United States Patent Office 2,947,278
Patented Aug. 2, 1960

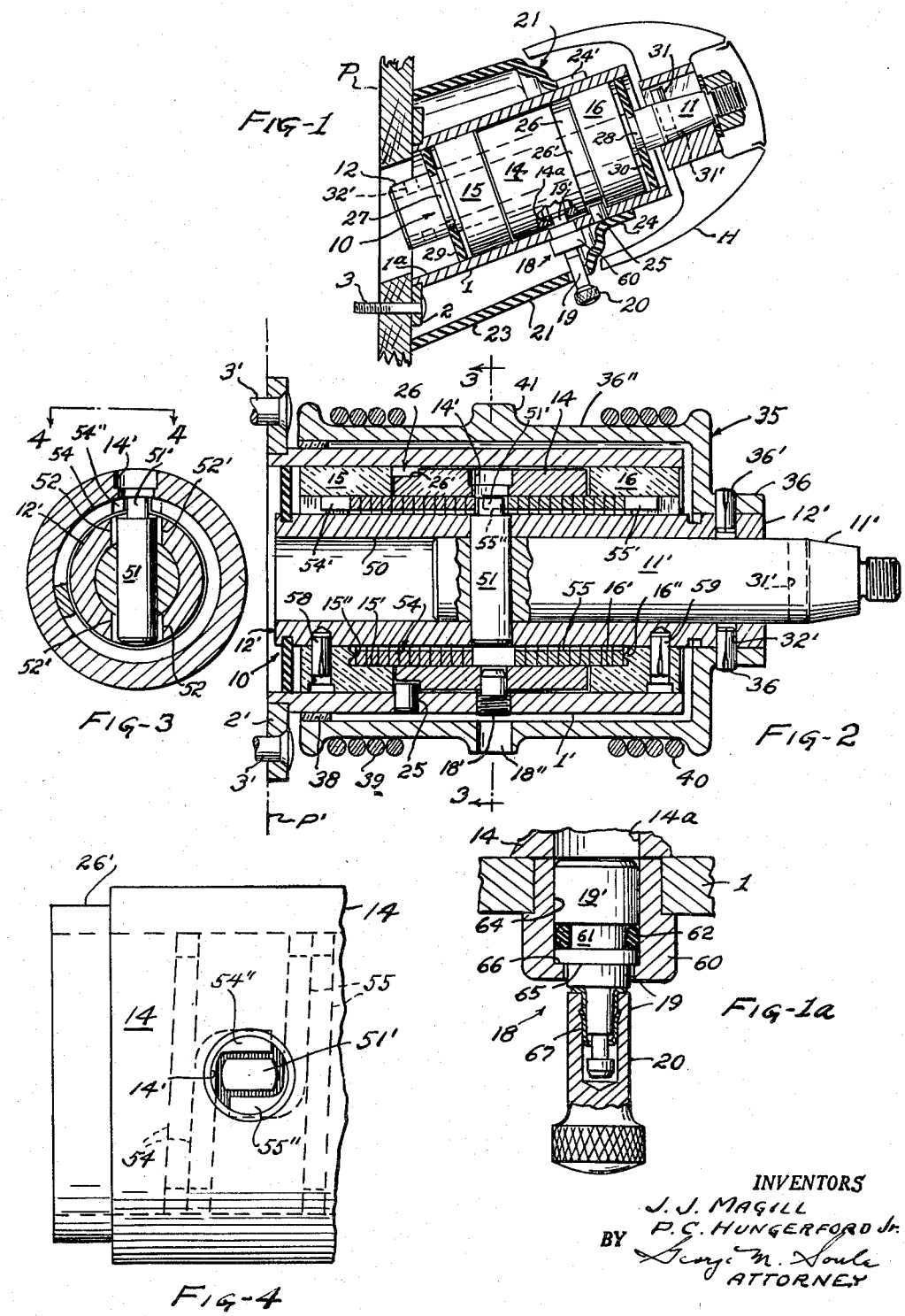

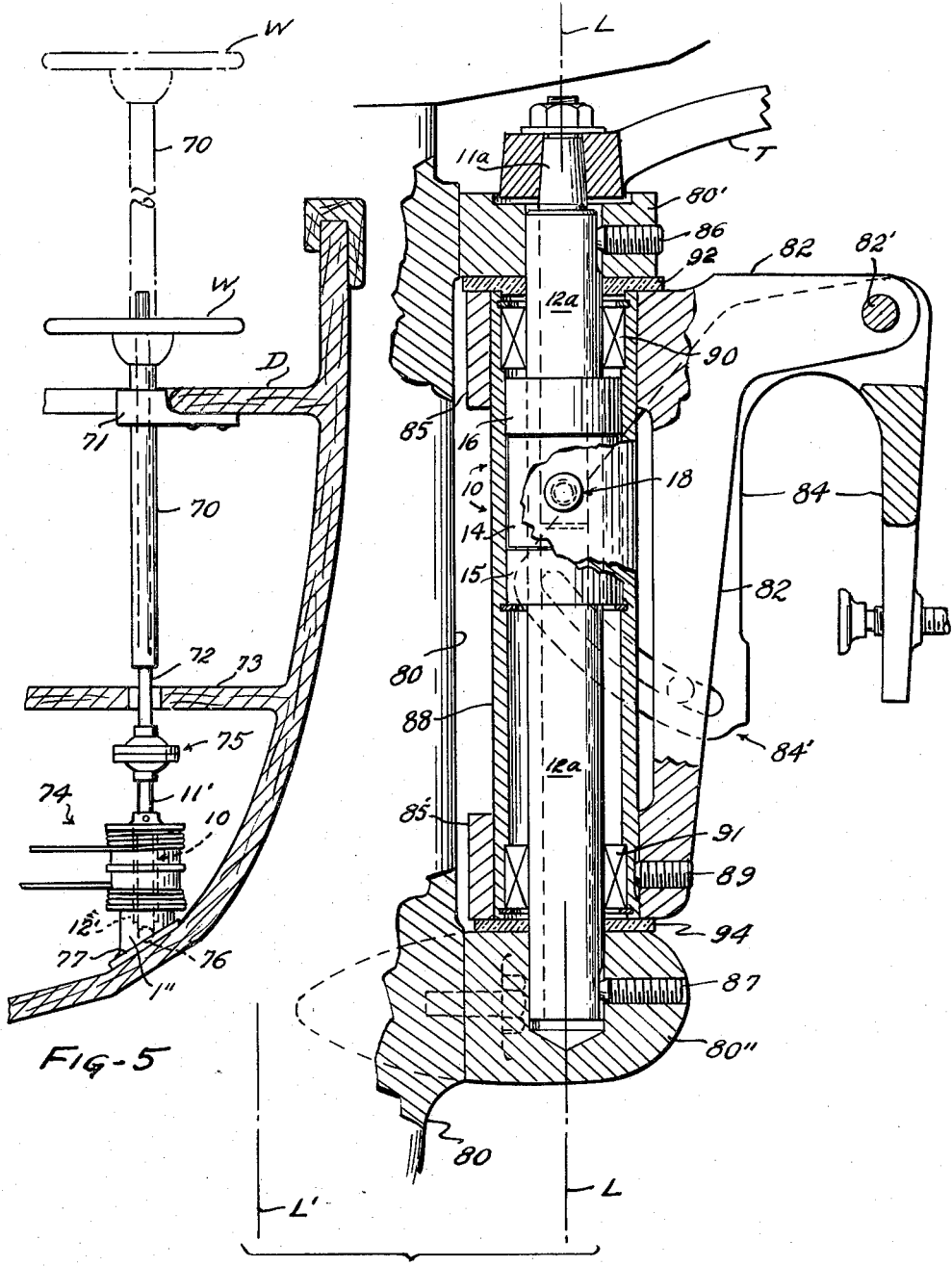

2,947,278

STEERING MECHANISMS FOR BOATS, TRACTORS AND THE LIKE

John J. Magill, Willowick, and Philip C. Hungerford, Jr., Cleveland Heights, Ohio, assignors to Curtiss-Wright Corporation, a corporation of Delaware Filed Apr. 28, 1958, Ser. No. 731,271

17 Claims. (Cl. 115—18)

This invention relates to steering mechanism of the type shown in an application of G. E. Bevis et al., Ser. No. 694,956 filed November 7, 1957 and to improvements in bidirectional no-back couplings such as shown in the just mentioned application and in an application of P. C. Hungerford, Jr., Ser. No. 702,846 filed December 16, 1957. Hereinafter bidirectional no-back coupling will usually be abbreviated B.D.N.B.

B.D.N.B. units of the type shown in the above identified applications can be most successfully applied for manual steering of tractors, outboard motor units and rudders of inboard-motor-equipped boats, etc. through provision of frictional two-way locking helical coil brake devices arranged to impart torque as from a steering wheel or tiller through an input shaft of the device to an output shaft thereof and with the helical coil or coils so arranged as to block (with approximately zero backlash or free play) antireverse drive from the dirigible portion of the equipment subject to external forces to the input shaft hence steering wheel or other operator-modulated part. Such B.D.N.B. steering units with appropriate auxiliary mechanisms can be easily rigged to standard steering control cables going to the rudder or outboard motor unit, and can be easily applied directly to the steering column shaft of tractors and other land vehicles, so as to permit conventional steering by the pilot or driver but without possibility, when desired, of transmission of external forces imposed on the rudder or tractor wheels to the pilot or driver.

In the making of such B.D.N.B. units for steering and by the use of helical friction springs the internal construction and mounting must be such as to insure blocking of back drive notwithstanding rather tremendous forces sometimes involved (and in two angular directions) while insuring against unintended or improper locking of the helical springs against their associated stationary drum or drums, since that would effectually take the steering control away from the operator or pilot and be disastrous under many circumstances. Other problems involve mounting of the B.D.N.B. units as on cabin cruisers, houseboats, etc. already in use or against boat hull walls without disturbing the interior paneling or boat wall any more than necessary, and without having to change the position of already installed steering control cable drums when such are employed. Additionally, it is highly important to shield the B.D.N.B. components from contact with salt water and other foreign matter likely to be destructive or likely to reduce the expected life of the units.

In many installations it is desirable to render the B.D.N.B. mechanism temporarily inoperative such as, for example when applied to outboard motor units having a tiller, so that the pilot can leave his normal steering position at the helm and steer the boat by direct manipulation of the tiller.

The present invention provides solutions to the various problems outlined above and generally improves the construction and operation and adaptability of B.D.N.B. units, particularly for steering purposes.

Various objects and novel features of the present invention not indicated above will become apparent from the following description of the preferred forms shown herewith. The essential characteristics are summarized in the claims.

In the drawings, Fig. 1 is a relatively small scale view showing the B.D.N.B. unit hereof in elevation and a mounting therefor in one type of steering assembly, the mounting and associated parts being shown in central cross section or in a vertical plane congruent with the common axis of the input and output shafting. Fig. 1a is a relatively greatly enlarged detail assembly view of the preferred release latch pin arrangement of Fig. 1. Fig. 2 is a relatively enlarged or full scale generally central longitudinal sectional view showing another type of mounting as for houseboat or cabin installation. Fig. 3 is a detail cross sectional view taken substantially along the line 3—3 on Fig. 2. Fig. 4 is a relatively enlarged detail plan view taken as indicated by the line 4—4 on Fig. 3. Fig. 5 is a more or less diagrammatic, small scale view showing another type of marine steering gear installation to which the mechanism according to Fig. 2 is well adapted. Fig. 6 is a vertical cross sectional assembly view showing an improved arrangement of the present B.D.N.B. unit for outboard motorboat steering.

Referring to Fig. 1, a main tubular housing 1 for the B.D.N.B. unit 10 has a suitably disposed rigid bracket or flange portion 2 adapted to be secured as by bolts 3, one shown, to the dash panel P or other suitable part of the motorboat assembly. The portions of the unit 10 as partially shown in Fig. 1 comprise: input shaft or member 11; output shaft or member 12; normally stationary sleeve or drum 14, and output-shaft-connected hubs or collars 15 and 16. All of those parts with exception of sleeve or drum 14 turn approximately as a unit for steering; and, when the sleeve 14 is released from the housing 1 as by means of a release latch mechanism generally indicated 18, all the B.D.N.B. parts can at all times turn freely as a unit. With the latch mechanism in the condition illustrated in Fig. 1, a head portion 19′ of latch plunger 19 having an operating stem 20 is in slip fitting contact with a radial hole or socket 14a in the sleeve 14. In that case torque can be easily and accurately transmitted from the drive shaft 11 to the output shaft 12, but the output shaft cannot be turned by its connected load in a manner to transmit torque back to the input or drive shaft 11.

A weather proofing skirt or guard 21, preferably made of plastic material, surrounds the housing 1 in partially spaced relationship thereto so that a skirt portion 23 of the guard 21 lies over the flange portion 2 of the housing 1 and makes snug sealing contact with the dash panel P. A resilient neck portion 24 of the guard 21, preferably slotted in various places as at 24′, closely embraces thhe housing 1, yieldably or in interference fitting contact therewith. The assembly comprising normally stationary sleeve or drum 14, the two collars or hubs 15 and 16 and the input and output shafts of the B.D.N.B. unit 10 are held permanently in axially fixed position in the housing 1 preferably by a drive pin 25 in the wall of the housing 1. The inner end of the pin 25 freely enters a groove 26 formed in part by a stepped shoulder 26′ on the drum or sleeve 14 and in part by the hub or collar 15 as will be evident. In order further to seal the housing against entrance of water and other undesirable foreign matter into contact with the working parts of the B.D.N.B. unit 10, the input and output shafts 11 and 12 have peripheral grooves as at 27 and 28 and which snugly contain elastic inner marginal edge portions of respective yieldable sealing discs 29 and 30, e.g. rubber. The outer rim portions of the discs sealingly engage the internal cylindrical bore 1a of the housing 1, adjacent respective B.D.N.B. hubs or collars 15 and 16.

The hubs or collars 15 and 16, incidentally, are designed slightly larger in diameter than the outside diameter of the drum or sleeve 14, so that bearing contact between B.D.N.B. unit 10 and the housing 1 will normally occur only around the hubs or collars which can be made of soft metal as compared to that suitable for the drum or sleeve 14 which is preferably highly wear resisting steel.

A suitable steering wheel having a hub portion diagrammatically indicated at H, right Fig. 1, is secured to the input or drive shaft 11 as by a pin 31 in hole 31', and usually a drum (not shown) for one or two rudder or outboard motor unit control cables is similarly attached to the leftwardly projecting end of the output or driven shaft 12 as at holes 32'. Such a construction requires that the drum be positioned so as to be concealed from view by the dash or other panel such as P, which, of course, requires cutting a hole through the panel. This is avoided by the construction as shown in Fig. 2.

The B.D.N.B. release latch mechanism 18, Figs. 1 and 1a, includes, as shown, a mounting sleeve 60 for the pin or plunger element 19. A groove 61 in the plunger contains a sealing O-ring 62 which is snug in the bore portion 64 of the mounting sleeve, so that, when the latch pin or plunger has been withdrawn (of Fig. 1a) as by means of the stem 20 to disconnect the B.D.N.B. sleeve or drum 14 from the fixed housing 1, the latch pin or plunger will be self-retaining in drum-releasing position. A shoulder 65 formed on the shank of the plunger 19 abuts a reduced diameter shoulder portion 66 in the mounting sleeve 60 to limit the outward or drum-releasing or unlatching movement of the plunger. Preferably the releasing stem 20 is made separate from the portion 19' of the plunger, the two parts being secured together (after application of the plastic guard cover 21 around the B.D.N.B. assembly 1, 10 shown in Fig. 1) as by a split, spring friction thimble 67 tight in the stem portion 20.

In Fig. 2, the main housing 1' with its mounting or attaching flange 2' contains the B.D.N.B. unit mechanism 10, as in Fig. 1, except for the manner of securing the normally stationary drum or sleeve 14 of unit 10 to the tubular wall of the housing. Release means for the drum 14 in Fig. 2 is represented by a readily removable screw 18'. In Fig. 2 the steering control cable drum 35 has a hub portion 36 attached to an end portion of the output shaft 12' as by pins 36'; and the input shaft 11' extends from the same end of the housing 1' as does the output shaft portion 12'. The cable drum 35 has a windlass or spool portion 36", shown extending about and for approximately the entire length of the housing 1', and also has a suitable journal support on housing 1' at the end opposite the drum attachment 36', shown in the form of a bushing 38 in the cable drum bearing on the outer cylindrical surface of the housing 1'. The typical arrangement of cables about the spool portion of the drum 35, particularly for racing and other high speed or heavy duty watercraft, comprises two stretches of cable 39 and 40 each separately attached to the drum. In that case the external surface portions for the respective cables are usually separated from each other as by a rib 41 extending about the drum 35. A hole 18" in the rib 41 enables access to the removable screw 18' when the rudder or outboard motor unit (not shown) is or are in straight-forward steering position. The construction just described enables the entire B.D.N.B. and cable drum mechanism to be mounted on a panel or the like in a house-boat type craft or on any wall thereof with minimum disturbance or defacement of the paneling or wall such as diagrammatically indicated at P'.

Referring to Figs. 2, 3 and 4, the B.D.N.B. construction there shown is quite similar to the arrangement according to Figs. 1 and 2 of Hungerford application Ser. No. 702,846 except for the construction of counterparts of the hubs or collars 15 and 16 hereof and except for the construction of deenergizing or control means for the helical springs 54 and 55 hereof as shown by comparison of Figs. 3 and 4. Those parts are modified for reduction of radial space or envelope to a practical minimum and to greatly facilitate installation of the helical springs into their respective spring pocket portions of stationary drum 14 in proper relationship to each other and to the coacting parts as will be described.

Input shaft or member 11', Fig. 2, telescopes and is freely turnable within a suitable through bore 50 of the output shaft or member 12', and those two members are coupled together to limit relative angular movement by a cross pin 51. The cross pin as shown in Fig. 3, has clearance on either side with diametral slots of the output member 12 forming pairs of abutment shoulders 52 and 52' in the output member, and the clearance permits only such angular relative movement or free play between the input and output members as is necessary in order to deenergize the frictional helical coil springs 54 and 55. The coil springs are similarly wound, e.g. right hand or left hand, and are secured at their relatively outer axial extremities to the output member 12' via the collars or hubs 15 and 16 respectively. As shown, the springs have toe portions 54' and 55' respectively, seated snugly in axial slots of their respective collars or hubs 15 and 16. The springs are in interference fitting or preloaded relationship to the associated internal surfaces of the collars or hubs and to the internal peripheral surface of the normally fixed sleeve or drum 14. As shown in Fig. 4, the proximate or relatively near end portions of the springs (which, during assembly of the unit 10 are exposed for gauging through a radial opening 14' in the wall of the sleeve or drum 14) have relatively oppositely disposed lug or toe portions 54" and 55" lying on opposite sides of and in slightly spaced relationship to a reduced cross section end portion 51' of the cross pin 51.

If the circumferential clearance space between the cross pin projection 51' and the spring toes 54" and 55" is less than a predetermined minimum then it sometimes occurs that, upon completion of the coupler assembly 10, the springs will not be in fully seated position against the drums ("nestled" in place), and in that case, in operation, the springs can, in effect, refuse proper or rated load as when the rudder or the like attempts to drive backwards through the B.D.N.B. unit to the drive shaft 11 or 11'. More than the necessary clearance space between the cross pin projection 51' and the spring toes results in excessive backlash which, as in any steering mechanism, is undesirable.

In order to establish proper working relationships between the two helical springs 54, 55 and their coacting input member shoulders of unit 10, the shafts 11 and 12 (or 11' and 12') are first assembled together with the cross pin 51, and that assembly is installed in its approximately final position or as shown by Fig. 2. Then the springs, preferably with their associated collars or hubs 15 and 16, are turned manually into place in the normally stationary drum or sleeve 14 so that the deenergizing lugs or toes 54" and 55" of the springs are approximately in their final (e.g. Fig. 4, illustrated) relationship to the cross pin portion 51'. The cross pin 51 is located with reference to the play limiting shoulders 52 and 52', approximately midway thereof or as shown in Fig. 3, by the use of a jig (not shown) having parallel mutually rigid pins entering the wheel hub and cable drum attaching holes 31' and 32' in the input and output shafts respectively, and the hubs or collars 15 and 16 with the springs are then further turned in drum 14 for precise location. The minimum required spaces between the spring lugs and reduced pin portion 51' are obtained or determined by the use of removable feeler gauges (not shown but see shaded spaces in Fig. 4), and the collars 15 and 16 are finally fixed to the tubular hub of the output member 12 as by a suitable number of radial drive pins 58 and 59, Fig. 2, in holes drilled during assembly and while the feeler gauges and fixture pins are still in place.

It is important to prevent the helical springs 54 and 55 from being crowded axially in the assembly of the coupling 10. Crowding would cause the cross pin portion 51' to rub on the axially adjacent or end coil surfaces of the springs (see Fig. 4). Such rubbing, in previous B.D.N.B. constructions, has been found to cause energization of the springs such as 54 and 55 from the improper ends, thereby locking up the coupling and preventing its proper functioning. Preferably the "counterbore" or spring-receiving pockets 15' and 16' in the collars or hubs 15 and 16 are provided with axial abutment or spring locating surfaces 15" and 16" for the relatively remote end coils of the springs, the effective locations of which surfaces 15" and 16" follow the helical form of the associated end coils. Such surfaces may be provided as moulded bosses or as inserted pins occupying the pockets. Preferably the collars or hubs 15 and 16 are oil charged sintered metal, e.g. "Oilite" bronze, to provide good supporting bearings for the end portions of the B.D.N.B. unit 10 in the housing 1, in which case it is economical to form the surfaces 15" and 16" as molded bosses on the effective bottoms of the pockets 15' and 16' in the collars. With the springs seated against the bosses, axial clearance between the cross pin portion 51' and adjacent axially facing surfaces of the spring end coils as shown in Fig. 4 can be determined by the use of removable feeler gauge strips applied while the collars or hubs 15 and 16 are being located for placement of the holes for the locking pins 58 and 59. All of the necessary feeler gauge strips discussed above are preferably mounted on a single tool (not shown) which is removed from between the cross pin end portion 51' and the toe portions of the springs as soon as the locking pins 58 and 59 have been driven into place.

Fig. 5 shows a type of marine steering gear wherein the steering wheel W has provision for operation at several elevations. Such arrangement may comprise, for example, a tubular wheel-supporting shaft 70 supported as on a bracket 71 near the deck plate D of the boat and an extension shaft 72, splined thereto, either or both of which shafts may extend below the floor deck 73 for connection with the rudder-connected cable system, the input parts of which are represented generally at 74. With this arrangement the steersman can elevate the steering wheel W as much as desired, as in order to steer from a standing position on the floor or lower deck of the boat or from a standing position on the deck plate D. The shaft 72 is shown as secured to the input shaft 11' of the B.D.N.B. unit 10, which may be constructed generally according to Fig. 2 hereof, through any suitable flexible or other coupling such as indicated at 75. The output shaft 12' of unit 10 (or the input shaft if extended through unit 10) may have a suitable footstep bearing as at 76 in a bracket 77 secured to a suitable support built into the main hull of the boat. The bracket can be secured directly to the bottom wall of the hull, as illustrated, in that case the B.D.N.B. and cable drum construction according to Fig. 2 avoids having to cut a hole through the wall of the hull.

The outboard motor steering mechanism as shown in Fig. 6 enables swinging of the power head and propeller shaft housing 80 (partially shown) about an axis L which is offset forwardly (as in more or less conventional outboard motor unit construction) from the propeller drive shaft axis represented at L'. The axes L and L' have a fixed relationship to a main mounting or steering pivot supporting or tilting bracket such as 82 which, in turn, is horizontally pivoted as on a pivot pin 82' for enabling the power head and propeller shaft housing unit 80 to be swung inboard in reference to a transom mounting bracket assembly such as 84. Tilt adjustment and securing means is indicated generally at 84'

The steering pivot connections between the housing 80 and bracket 82 includes, as shown, mounting arm or bracket portions 80' and 80" of housing 80, either or both of which may be separable from the housing 80 generally. Those arm portions, as shown, receive between them upper and lower arm portions 85 and 85' of the bracket 82. In the usual outboard motor unit construction, bracket or housing portions 80', 80", 85 and 85' or counterparts thereof are interconnected by a single pivot shaft or pin, not shown hereby. In the present construction the output shaft or member 12a of the B.D.N.B. unit 10, is extended beyond respective ends of the unit 10 for rigid interconnection with the housing 80 as at bracket or arm portions 80' and 80" of the housing via attaching pins or screws 86 and 87 respectively.

Input shaft 11a of the B.D.N.B. unit 10 extends upwardly through the top end of the tubular output shaft 12a for attachment to a tiller arm T or to an operating sprocket or sheave (not shown) suitably secured rigidly to the input shaft. Housing tube 88 which, as shown, extends into both arm portions 85 and 85' of the tilt adjustment bracket 82 is secured to one or both of those arm portions, see screw 89 at lower arm portion 85'.

The release plunger 20 of latch device 18 is supported on the tube or housing 88, preferably at one side thereof, as indicated. The latch device normally holds the drum or sleeve portion 14 of the B.D.N.B. unit 10 against rotation but permits portion 14 to turn when desired so that forces imposed on the rudder and propeller unit may be transmitted back to the tiller T or other steering gear element connected with the input shaft 11a. Output shaft 12a, as shown, has suitable bearings as at 90 and 91 in respective ends of the fixed tube or housing 88; and thrust washers 92 and 94 between the tube and bracket assembly 85, 88, etc. and the motor unit and propeller shaft housing 80 may incorporate suitable seals (not shown) for preventing entrance of water or the like into the tube 88.

We claim:

1. A steering mechanism for vehicles comprising a tubular housing adapted for connection to a frame portion of a vehicle, an input shaft extending into one end of the housing concentric therewith, a tubular output shaft around and telescoping at least a portion of the input shaft and journalled for angular movement within the housing at spaced apart regions of the housing axially thereof, a self-energizing friction braking means including a brake drum within the housing between the spaced journal supports, two-way-acting brake elements frictionally connecting the output shaft and said drum and respectively releaseable from the drum by the input shaft but not by the output shaft, a radial opening in the housing in the transverse plane of the drum, a socket in the drum normally aligned with the opening, and a latching plunger slidably supported in the opening of the housing and capable of holding the drum against angular movement or releasing it to permit its angular movement.

2. The steering mechanism according to claim 1, including a sleeve rigid with the housing around the opening and slidably supporting the latching plunger, an elastic O-ring seal around the plunger and within the sleeve and frictionally engaging the inner wall of the sleeve with sufficient force to hold the latch plunger in unlatching position, the plunger and sleeve having coacting shoulders preventing removal of the plunger from the sleeve.

3. In a steering mechanism for a dirigible element of a vehicle, a tubular housing adapted for attachment to a fixed part of the vehicle at one end of the housing, an input shaft within the housing coaxially thereof for connection to a steering wheel or the like and extending from the opposite end of the housing, a bidirectional no-back coupling mechanism supported within the housing and having an output shaft in the form of a sleeve supported by respective axially spaced apart internal peripheral surface portions of the housing and extending out of said opposite end of the housing, self-energizing friction braking means between the output shaft and the housing and capable of locking the output shaft to the housing except when torque is being applied from the input shaft to the output shaft, and means on the outwardly projecting end of the output shaft for connection thereof to the dirigible element of the vehicle.

4. In or for a vehicle having a dirigible element adapted for steering the vehicle and a framework supporting said element, a steering shaft adapted for connection to a steering wheel or the like, a tubular housing coaxial with the shaft and adapted for rigid connection to said framework at one end of the housing, a tubular output member in telescoping relationship to the shaft and having a lost motion angular two-way torque transmitting connection therewith, said output member having axially spaced apart portions journalled against respective internal surfaces of the housing, said output member projecting from the housing at the end thereof opposite the point or region of connection of the housing with the vehicle framework, a bidirectional no-back brake mechanism between the input shaft and the output member reacting on an inner wall of the housing for preventing transmission of torque from the output member to the shaft while enabling the shaft to turn the output member in opposite angular directions, and means connecting the outwardly projecting end of the output member to said dirigible element.

5. The steering mechanism according to claim 4, wherein the last mentioned means includes a steering control cable drum in telescoping relationship to the tubular housing and journalled thereon at or near one end to turn relative thereto, an opposite end portion of the drum being connected for radial support to said projecting end of the output member.

6. In and for a vehicle having a framework and a dirigible element supported thereby and adapted for steering of the vehicle, a tubular housing adapted at one end for approximately fixed support by the vehicle framework, a shaft concentric with the housing and extending thereinto from the opposite end of the housing, a tubular output member in the housing telescoping the shaft and journalled for angular movement within the housing, a lost motion torque transmitting connection between the shaft and output member, self-energizing bidirectional braking means between the output member and the housing capable of preventing transmission of torque from the output member to the shaft, a cable drum surrounding a portion of the housing, telescoping the housing and supported directly by the output member at said opposite end of the housing, and a cable on the drum for connection with the dirigible element of the vehicle.

7. In and for a vehicle having a frame and a dirigible element adapted for steering the vehicle, a tubular housing having a flange at one end thereof for attachment to the frame and being open at the opposite end, a bidirectional no-back brake assembly journalled in the housing and having a brake drum portion secured to the housing to prevent its rotation, an input shaft extending into the open end of the housing, an output shaft telescoping the input shaft and extending from said open end of the housing, a pair of collars respectively at opposite ends of the drum and secured to the output shaft and journalled in the housing for radial support and angular movement about the axis of the input shaft, means for connecting the outwardly projecting portion of the output shaft to said dirigible element, a pair of helical springs in self-energizing relationship to the drum and secured respectively to the collars of the output shaft, and means connected to the input shaft and operatingly connected to the springs for deenergizing one of the springs during relative limited angular movement between the input shaft and the output shaft in one direction and for deenergizing the other spring by relative angular limited movement in the opposite direction.

8. In combination with an outboard motor unit of the type having a housing for a generally upright propeller drive shaft and a supporting bracket for the motor unit housing pivotally connected thereto on an axis offset from the drive shaft axis for steering; a tubular housing around the pivot axis fixed to the bracket, a bidirectional no-back brake in the tubular housing having relatively telescoping input and output shafts concentric with the tubular housing, the output shaft being tubular and secured to the motor unit housing beyond one end of the tubular housing, and the input shaft projecting from the output shaft and from the tubular housing at the same end of the latter for connection to a tiller or other means operatable for steering the motor unit.

9. The mechanism according to claim 8, wherein the output shaft is journalled for radial support in the tubular housing at opposite ends of the no-back brake.

10. The mechanism according to claim 8, wherein the no-back brake includes a normally non-rotary brake drum in the tubular housing concentric therewith, and latch means carried by a wall of the housing normally engaged with the brake drum to prevent it from turning but releasable therefrom to permit the brake drum to turn.

11. In combination with an outboard motor unit of the type having a housing for a generally upright propeller drive shaft and a supporting bracket for the housing pivotally connected to the housing on an axis offset from the axis of the propeller shaft; a tubular housing around the pivot axis fixed to the bracket, a bidirectional no-back friction brake in the tubular housing and including an input shaft in the tubular housing operable from a point outside that housing for steering, and an output shaft extending from both ends of the tubular housing and fixed to the propeller drive shaft housing at both ends of the output shaft.

12. In a bidirectional no-back coupling, a tubular generally cylindrical housing, an input shaft coaxial with the housing and extending thereinto, an output shaft telescoping the input shaft and having collar portions journalled in the housing for support and angular movement of the output shaft at spaced regions axially of the housing, a brake drum axially between the collars, self-energizing, two-way-acting friction brake elements connecting the output shaft and the drum, means connecting the input shaft with the brake elements in a manner to release them respectively from locking contact with the drum when the input shaft is turned in relatively opposite directions; and means supported rigidly by a wall portion of the housing and extending radially inwardly thereof between one of the collars and the drum to hold the drum and output shaft in position in the housing.

13. The mechanism according to claim 12, wherein the drum is generally cylindrical and has a radially inwardly stepped external diameter portion adjacent said one of the collar portions of the output shaft, means to release the brake drum from the housing so that it can turn in the housing, and said holding means comprises a radial pin in the housing wall projecting into the peripheral groove formed by the stepped diameter portion of the drum and said one collar portion.

14. In a no-back steering unit for boats, a tubular housing having a flange adapted to be secured to a wall of a boat, a bi-directional no back coupling releasably secured in the housing and having input and output shafts concentric with the housing and projecting therefrom axially for connection respectively to a steering wheel or the like and to steering linkage, a cup-like cover around the housing and snugly and sealingly fitting an external surface portion of the housing, the cover having a peripherally continuous relatively enlarged rim portion terminating in a plane approximately flush with the relatively outer axial face of the flange.

15. In a bidirectional no-back coupling, a tubular brake drum, a tubular output shaft in the drum coaxial therewith for connection with a load, an input shaft contained, in part at least, by the output shaft, a cross pin diametrally of the shafts and establishing a lost motion angular torque transmitting connection therebetween, a portion of the cross pin projecting radially beyond the outer surface of the output shaft, a pair of helical braking springs preloaded in the drum and with free end deenergizing lug portions located on opposite sides of the projecting portion of the cross pin, close thereto, anchor collars surrounding the output shaft for the relatively remote ends of the springs and capable of angular adjustment on the output shaft and of being secured tightly thereto to determine the relative position of the lugs and cross pin, and an opening in the wall of the drum radially aligned with the cross pin for exposing portions of the lugs and adjacent coil portions of the springs.

16. In a bidirectional no-back coupling, a tubular generally cylindrical non-rotatable housing, an input shaft coaxial with the housing, an output shaft coaxial with the input shaft and having collar portions journalled in the housing for support and angular movement of the output shaft at spaced regions axially of the housing, a brake drum secured to the housing and disposed axially between the collars, two self-energizing, oppositely acting helical friction brake elements connected to respective collars and thereby lockingly connecting the output shaft and the drum, and abutment means connecting the input shaft with the brake elements in a manner to release them respectively from locking contact with the drum when the input shaft is turned in relatively opposite directions.

17. In a bidirectional no-back coupling, a tubular brake drum, a tubular shaft in the drum coaxial therewith, a second shaft a portion of which projects into the tubular shaft, a cross pin diametrally of the shafts and establishing a lost motion angular torque transmitting connection therebetween, a portion of the cross pin projecting radially beyond the outer peripheral surface of the tubular shaft, a pair of helical braking springs preloaded in the drum and having free end deenergizing lug portions located on opposite sides of the projecting portion of the cross pin, close thereto, anchoring collars for the relatively remote ends of the springs surrounding the tubular shaft and capable of angular adjustment on the tubular shaft and of being tightly secured thereto to fix the relative position of the lugs and cross pin, and an opening in the wall of the drum radially aligned with the cross pin in one position thereof for exposing the working surface portions of the lugs and cross pin.

References Cited in the file of this patent
UNITED STATES PATENTS

| | | |
|---|---|---|
| 2,075,567 | Benedek | Mar. 30, 1937 |
| 2,819,777 | Kosch | Jan. 14, 1958 |